S. G. THOMSON.
LOCOMOTIVE.
APPLICATION FILED MAY 10, 1915.
1,152,863.
Patented Sept. 7, 1915.
3 SHEETS—SHEET 1.
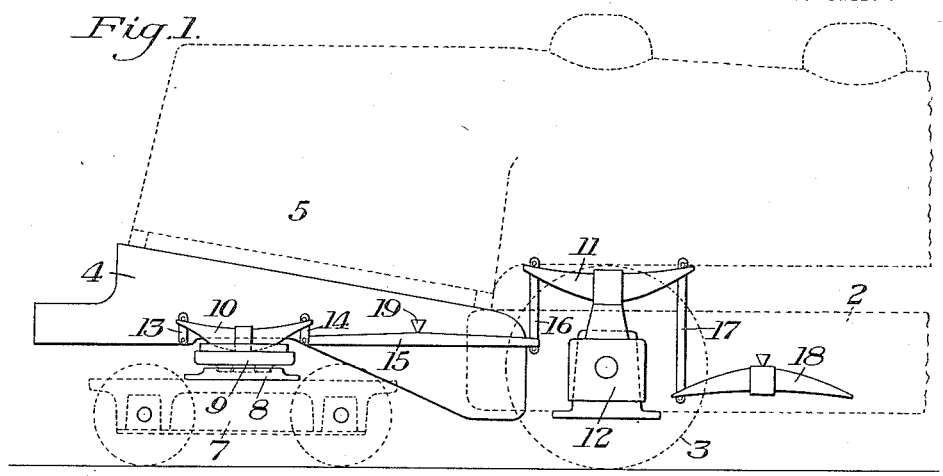
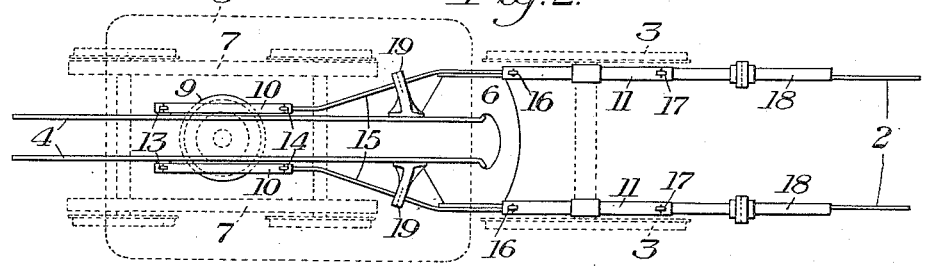
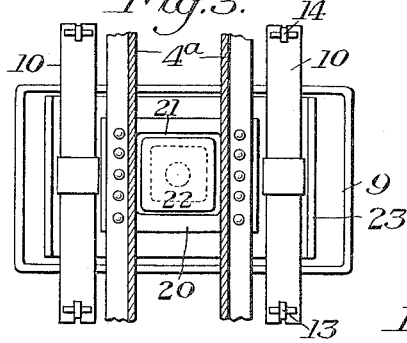
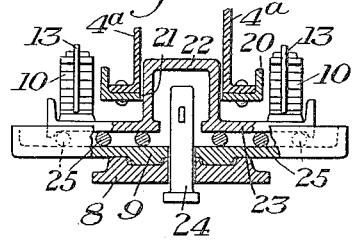
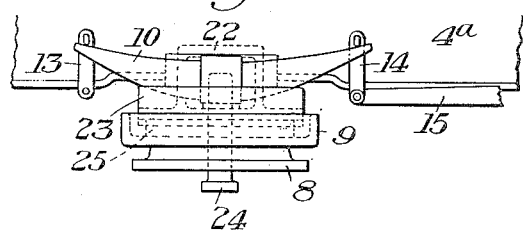
WITNESSES
INVENTOR
S. G. Thomson

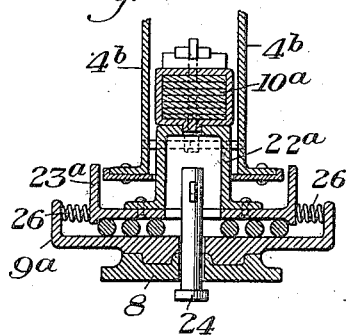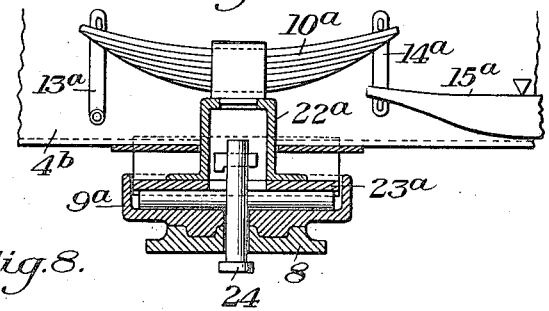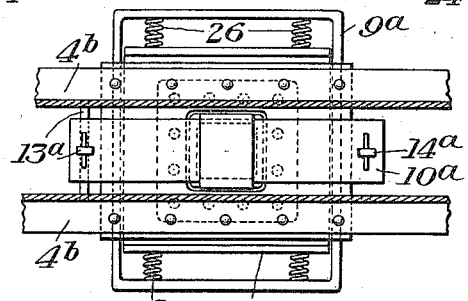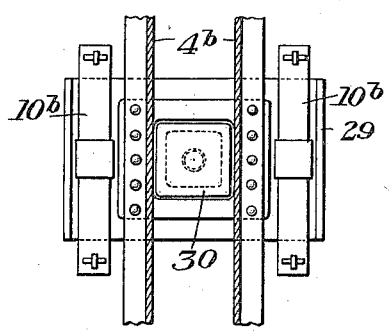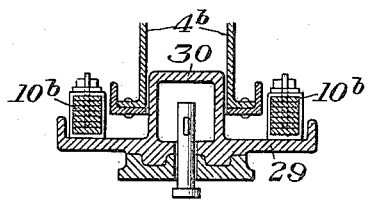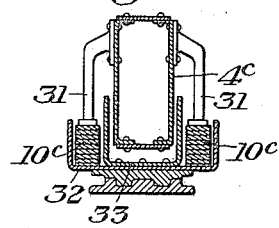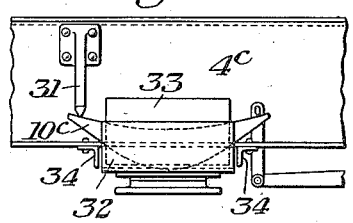

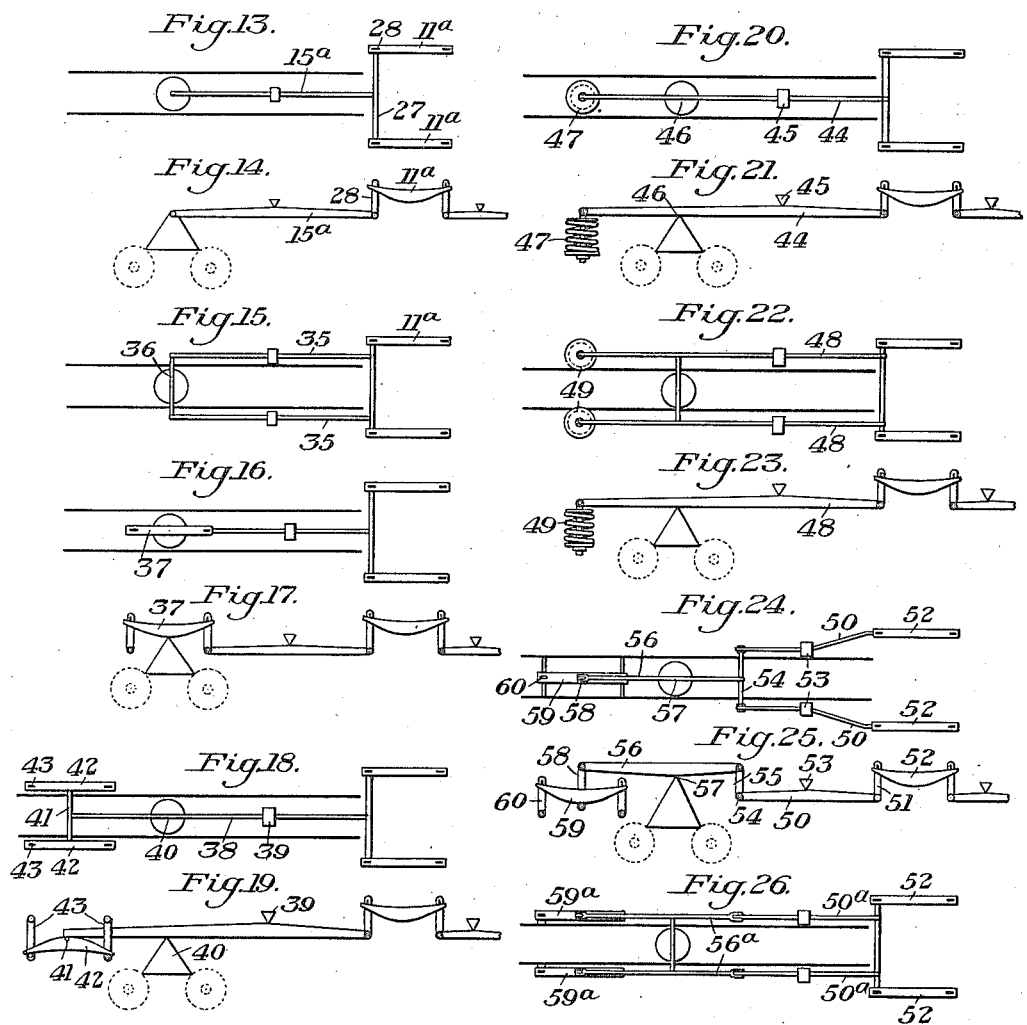

UNITED STATES PATENT OFFICE.

SAMUEL G. THOMSON, OF READING, PENNSYLVANIA.

LOCOMOTIVE.

1,152,863.

Specification of Letters Patent.

Patented Sept. 7, 1915.

Application filed May 10, 1915. Serial No. 26,976.

*To all whom it may concern:*

Be it known that I, SAMUEL G. THOMSON, a citizen of the United States, residing at Reading, in the county of Berks and State of Pennsylvania, have invented a new and useful Improvement in Locomotives, of which the following is a full, clear, and exact description, reference being had to the accompanying drawings, forming part of this specification, in which—

Figure 1 is an elevation of a portion of a locomotive having one form of my invention applied thereto, the parts embodying the present invention being shown in full lines and the remaining parts in dotted lines; Fig. 2 is a plan view of the same; Figs. 3 and 4 are detail sectional views showing one form of center plate construction and spring rigging which may be used in connecting the back frame with a trailer truck; Fig. 5 is a detail view showing the connection between one of the center plate springs and the equalizing lever; Figs. 6, 7 and 8 are detail sectional views illustrating a modification of the devices shown in Figs. 3, 4, 5 and 6; Figs. 9 and 10 are sectional views showing still another arrangement of these parts; and Figs. 11 and 12 are detail views showing still another arrangement; and Figs. 13 to 27, inclusive, are diagrammatic views illustrating various embodiments of the invention.

In my pending application, Serial No. 3,912, I have described and claimed an improvement in locomotives, in which there is employed a centrally located back frame extending underneath the firebox for at least the greater portion of the length of the firebox and lying adjacent to its vertical center plane. In said application, I have also set forth fully the advantages of this construction. My present invention provides means for suspending this back frame above the center plate of the trailing truck of the locomotive by means of a flexible spring rigging bearing on said plate, and whereby the weight on the truck and on the driving wheel springs of the locomotive may be distributed in any desired proportion.

My present invention also embodies a feature of center plate construction which provides in itself for lateral movement of the truck and its return to central position. This feature of my invention may be used either on a solid truck frame which does not permit of lateral swinging, or may be used in connection with a swinging bolster, in which case the lateral movement is provided in addition to that afforded by the lateral swinging of the bolster itself. This increases the lateral rear end movement of the locomotive without causing undue strains.

Referring first to that form of my invention shown in Figs. 1 to 5 of the drawings, the numeral 2 designates the front main frames of the locomotive, which are spaced widely apart and lie in planes adjacent to and just inside the planes of the driving wheels 3. 4 designates the back frame which extends longitudinally under the central portion of the firebox 5 of the locomotive and lies adjacent to the vertical central plane of the firebox. This frame is joined in any suitable manner, as by a large casting 6, to the front frame 2. The numeral 7 designates the trailing truck of the locomotive underneath the firebox and carrying a center bearing 8 on its bolster. 9 designates the top center plate bearing on the plate 8. 10 designates springs placed over the center plate 9 and seated thereon in the manner presently described. 11 designates springs seated over the box 12 of the rear drivers 3. The back end of each of the springs 10 is connected to the back frame of the locomotive by means of a hanger 13. The front end of each of these springs is connected by a hanger 14 with the rear end of an equalizer bar or lever 15, which extends forwardly, and is connected at its forward end by a hanger 16 with the back end of the spring 11. The front end of each of the springs 11 is shown as having a hanger connection 17 with another spring 18 on the main frame of the locomotive. The bar or lever 15 is provided with a fulcrum at 19 on the back frame 4. The arrangement of the two equalizing bars or levers 15 will be clearly understood by reference to Fig. 2, which shows that they curve inwardly underneath the firebox in passing back to the springs 10. One of these springs 10 is seated on the center plate 9 at each side of the frame 4.

In Figs. 3 and 4, the two members 4ª of the frame 4 are shown as spaced apart and connected at their lower flanged edges by means of a binding plate 20, to which they are riveted. This binding plate is cut away, as indicated at 21, to form a hole for the upwardly projecting portion 22 of a casting 23, which carries the springs 10. The center pin 24 extends upwardly within the hollow interior of the portion 22 of this casting. The casting is shown as mounted on rollers 25 on the center plate 9, thus allowing for lateral displacement. If more friction is required, these rollers may, of course, be removed and the casting allowed to slide on the plate 9. Clearance is provided between the casting and the frame members 4ª. The connecting portion 22 of the casting extending upwardly between the frame members holds the casting firmly in place against lateral and longitudinal displacement.

It will be readily seen that the connections between the springs 10 and 11 form an equalizing or distributing rigging or system, whereby a weight on the truck and on the driving springs may be equalized or distributed in any desired proportion.

In the modification shown in Figs. 6, 7 and 8, the construction is, in general, similar to that shown in Figs. 3, 4 and 5, except that a single centrally arranged spring $10^a$ is employed, seated between the two frame members $4^b$, instead of the two springs 10, at opposite sides of said frame members. In these figures, I have also shown springs 26, seated between the flanges of the center plate $9^a$ and the casting $23^a$, these springs 26 giving a centralizing effect. In this construction, with the single elliptical spring $10^a$, the back spring hanger $13^a$ is connected across both frame members $4^b$, as most clearly shown in Fig. 8, and the front hanger $14^a$ is fastened to an equalizer $15^a$, which extends between the frame members $4^b$. This arrangement, with the exception of the spring, is also shown diagrammatically in Figs. 13 and 14. By reference to these figures, it will be seen that the equalizer $15^a$ is connected at its forward end to a transverse bar 27, which is suspended at its ends by hangers 28 from the rear driving wheel springs $11^a$. In Figs. 13 and 14, the equalizing bar lever is shown as directly connected to the center plate casting, without the interposition of any spring. Figs. 9 and 10 show, respectively, in plan and sectional elevation a somewhat similar arrangement, wherein vertical movement is provided for, but the provision for horizontal movement is eliminated. This is accomplished by making the spring-carrying casting 29 serve also as the male member of the center plate 30. In these figures, I have shown this construction as provided with springs $10^b$, arranged similarly to the springs 10, first described, but it will be obvious that the construction is also adaptable to the single spring arrangement shown in Figs. 6, 7 and 8.

Figs. 11 and 12 show, respectively, an end sectional view and a side elevation, in which the back frame member $4^c$ is in the form of a box girder. Secured to each side of this girder is a depending bearing member 31. These bearing members 31 depend into engagement with the rear ends of the springs $10^c$, in the manner shown in these figures. The springs $10^c$, in turn, rest in a deep channel 32, riveted to the male center plate casting; and another deep channel 33 is riveted to the channel 32, to afford a side thrust bearing for the springs and for the frame $4^c$. The longitudinal thrust is taken care of by means of angles 34, riveted to the frame members $4^c$, as shown in Fig. 12.

Fig. 15 shows a form of the invention similar to Fig. 13, except that there are two equalizing bars or levers 35, at opposite sides of the back frame, with a connection 36 between their rear ends, resting directly upon the center plate.

Figs. 16 and 17 show a construction generally similar to that of Fig. 13, but with an elliptical spring 37 over the center bearing of the trailing truck.

Figs. 18 and 19 show a modification in which a single equalizing bar or lever 38 has a fulcrum at 39 on the back frame, with another fulcrum at 40 over the center of the trailing truck, its rear end being extended beyond the truck and resting upon a bar 41, connecting the two springs 42, suspended from the back frame by hangers 43.

Figs. 20 and 21 show diagrammatically and respectively in plan and elevation a modification in which there is a single equalizing bar or lever 44, having a fulcrum on the back frame at 45, and another bearing at 46 over the center plate of the trailing truck, with its rear arm extended and tied to a helical spring 47 at the rear of the trailing truck.

Figs. 22 and 23 show in a corresponding manner a modification in which there are two of the equalizing bars or levers 48, each of which is tied at its rear end to a helical spring 49.

Figs. 24 and 25 show another modification with two equalizing bars 50, connected by hangers 51, at their rear ends to the springs 52, over the rear driving wheel boxes, and with fulcrums at 53 on the back frame. These bars or levers terminate in front of the trailing truck, where they are connected by a transverse bar 54. Connected by a link or hanger 55 with this bar is another equalizer 56 having a bearing 57 over the center plate of the trailing truck, with its rear end connected by a link or hanger 58, with an elliptical spring 59, hung from the back frame at 60.

Fig. 26 shows an arrangement similar to that of Figs. 24 and 25, except that each of the equalizing bars $50^a$, corresponding to the bars 50, is connected at its back end to a second equalizing bar $56^a$, and each of these equalizing bars is tied at its back end to a spring 59ª.

Fig. 27 shows diagrammatically an elevation somewhat similar to Fig. 13, in which no springs are used between the fulcrum 61 on the back frame and the bearing on the rear truck. This figure shows clearly the principle involved in all of the preceding figures, including the suspension of the frame in a center plate construction, which allows vertical clearance as well as providing means for taking care of longitudinal and lateral stresses. In this figure, the rear end of the equalizing bar is connected to a casting 62, over which the back frame is suspended, and which forms the male center bearing member.

My invention is susceptible of other modifications, as will be obvious after the principle involved in the forms herein shown and described is understood. Hence, I do not desire to limit myself to these particular constructions and arrangements of parts.

I claim:

1. A locomotive having a supporting frame extending longitudinally underneath a locomotive firebox and lying adjacent to the vertical center plane of the firebox, a rear truck, and an equalizing rigging or system which connects the bearing on said truck with the back driving wheel springs of the locomotive.

2. A locomotive having a supporting frame extending longitudinally for at least the greater portion of the length of its firebox and lying adjacent to its vertical center plane, a rear truck, and a suspending rigging for said frame, said rigging acting to carry at least a portion of the weight resting on said truck.

3. A locomotive having a supporting frame extending longitudinally for at least the greater portion of the length of its firebox, and lying adjacent to its vertical center plane, a rear truck, and means for distributing the weight of the locomotive driving wheels and that of the truck in any desirable proportion.

4. A locomotive having a supporting frame extending longitudinally for the greater portion of the length of its firebox and lying adjacent to its vertical center plane, and a rear truck, said frame having a fulcrum and a lever bearing on said fulcrum and connected to the locomotive spring rigging and acting to transmit a portion of the locomotive weight to said truck.

5. A locomotive having a supporting frame extending longitudinally along the greater portion of the length of its firebox and lying adjacent to its vertical center plane, a rear truck, and a spring resting on said truck, said frame being suspended free of the truck and having a fulcrum and a lever acting against said fulcrum and forming a part of a rigging which connects the truck spring with the back driving springs of the locomotive.

6. A locomotive having a supporting frame extending longitudinally for the greater portion of the length of its firebox lying adjacent to its vertical center plane, a rear truck, and a rigging connected to the back driving wheel springs of the locomotive, said frame resting on said rigging and said rigging resting on said truck.

7. A locomotive having a supporting frame extending longitudinally for the greater portion of the length of its firebox lying adjacent to its vertical center plane, a rear truck, and a rigging connected to the back driving wheel springs of the locomotive, said frame being suspended free from said truck and resting on said rigging, and said rigging consisting of levers and springs arranged to afford a yielding bearing on said truck.

8. A locomotive having a supporting frame extending longitudinally for at least the greater portion of the length of its firebox and lying adjacent to its vertical center plane, a bearing for a truck under said frame, a spring seated on said bearing, a spring seated over the back driving wheel springs of the locomotive, and an equalizing system connecting said springs.

9. A locomotive having a back supporting frame extending longitudinally along the greater portion of the length of its firebox and lying adjacent to its vertical center plane, and a rear truck with a center plate under said frame, said center plate being free to move vertically with reference to said frame.

10. A locomotive having a back supporting frame extending longitudinally along the greater portion of the length of its firebox and lying adjacent to its vertical center plane, and a rear truck with a center plate under said frame, said center plate being free to move vertically with reference to said frame, and providing for lateral movement of said truck.

11. A locomotive having a back supporting frame extending longitudinally along the greater portion of the length of its firebox and lying adjacent to its vertical center plane, and a rear truck with a center plate under said frame, said center plate providing means for affording lateral movement to the truck with reference to said frame and for returning the truck to central position.

12. In a locomotive, a centrally located longitudinal frame extending under the greater portion of the length of the locomotive firebox, a truck, and a center connection between the frame and the truck, said center connection providing means for allowing the truck to move both vertically and laterally with reference to said frame and also in horizontal rotation around its own center.

13. In a locomotive, a back frame extending centrally underneath the firebox of the locomotive, a truck center plate, a spring rigging seated on said center plate, means for permitting vertical movement of the center plate with reference to said frame, and a connection between said spring rigging and the forward boxes of the rear driving wheels of the locomotive.

In testimony whereof, I have hereunto set my hand.

SAMUEL G. THOMSON.

Witnesses:
 HARRY EGOLF,
 J. I. BEST.